US011440296B2

(12) United States Patent
Yoshida et al.

(10) Patent No.: US 11,440,296 B2
(45) Date of Patent: Sep. 13, 2022

(54) LAMINATED GLASS INTERMEDIATE FILM AND LAMINATED GLASS

(71) Applicant: SEKISUI CHEMICAL CO., LTD., Osaka (JP)

(72) Inventors: Shougo Yoshida, Otsu (JP); Hajime Shouhi, Dusseldorf (DE)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/975,217

(22) PCT Filed: Feb. 27, 2019

(86) PCT No.: PCT/JP2019/007473
§ 371 (c)(1),
(2) Date: Aug. 24, 2020

(87) PCT Pub. No.: WO2019/168001
PCT Pub. Date: Sep. 6, 2019

(65) Prior Publication Data
US 2020/0391487 A1  Dec. 17, 2020

(30) Foreign Application Priority Data
Feb. 27, 2018  (JP) .............................. JP2018-033492

(51) Int. Cl.
*B32B 17/10*  (2006.01)
*C08K 5/07*  (2006.01)
*C08K 5/3475*  (2006.01)

(52) U.S. Cl.
CPC ........ *B32B 17/10678* (2013.01); *B32B 17/10* (2013.01); *B32B 17/10036* (2013.01); *B32B 17/10761* (2013.01); *C08K 5/07* (2013.01); *C08K 5/3475* (2013.01); *B32B 2307/40* (2013.01); *B32B 2605/006* (2013.01)

(58) Field of Classification Search
None
See application file for complete search history.

(56) References Cited

U.S. PATENT DOCUMENTS

| 2008/0157025 A1 | 7/2008 | Fritzsche et al. |
| 2013/0194659 A1 | 8/2013 | Hatta et al. |
| 2014/0371356 A1 | 12/2014 | Lellig et al. |
| 2015/0158275 A1 | 6/2015 | D'Errico et al. |
| 2016/0311199 A1* | 10/2016 | Iwamoto ............ B32B 17/10 |
| 2019/0375198 A1* | 12/2019 | Baker ................ C08K 5/3472 |

FOREIGN PATENT DOCUMENTS

| CN | 106574027 | 4/2017 |
| EP | 2 813 543 | 12/2014 |
| EP | 3 690 503 | 8/2020 |
| JP | 2012-46748 | 3/2012 |
| JP | 2017-501953 | 1/2017 |
| WO | 2012/023616 | 2/2012 |
| WO | 2017/033872 | 3/2017 |
| WO | 2018/098074 | 5/2018 |

OTHER PUBLICATIONS

Nikafshar, "The Effects of UV Light on the Chemical and Mechanical Properties of a Transparent Epoxy-Diamine System in the Presence of an Organic UV Absorber," Materials, 2017, 10, 180. (Year: 2017).*
Extended European Search Report dated Oct. 1, 2021 in European Patent Application No. 19760957.1.
BASF Aerospace Materials, "Tinuvin® CarboProtect® Advanced UV absorber technology", Dec. 31, 2012, pp. 1-4, XP55843415.
International Search Report (ISR) dated Apr. 23, 2019 in International (PCT) Application No. PCT/JP2019/007473.

* cited by examiner

*Primary Examiner* — David Sample
(74) *Attorney, Agent, or Firm* — Wenderoth, Lind & Ponack, L.L.P.

(57) ABSTRACT

An interlayer film for a laminated glass according to the present invention comprises a benzotriazole-based compound having a maximum absorption wavelength peak of 370 nm or more and 405 nm or less, and has a transmittance difference represented by $T_{1000}-T_0$ of less than 2.0%, wherein $T_{1000}$ represents a transmittance at 400 nm after being irradiated with xenon light having an irradiance of 180 w/m² for 1000 hours at a black panel temperature of 83° C., a temperature in a chamber of 50° C., and a humidity in a chamber of 50% RH, and $T_0$ represents a transmittance at 400 nm before being irradiated.

11 Claims, No Drawings

LAMINATED GLASS INTERMEDIATE FILM AND LAMINATED GLASS

TECHNICAL FIELD

The present invention relates to an interlayer film for a laminated glass and laminated glass including the interlayer film for a laminated glass.

BACKGROUND ART

There has been widely known laminated glass obtained by interposing an intermediate film between two glass plates for integrating. The intermediate film is often formed of a plasticized polyvinyl acetal in which a plasticizer is blended in a polyvinyl acetal resin. Even if the laminated glass is externally shocked and damaged, bits of glass are less likely to be scattered, which is safe, so that the laminated glass is widely used as window glass for wheeled vehicles such as automobiles, airplanes, and architectural structures and the like. When the laminated glass is used as the window glass, the laminated glass is used in an environment where it is generally irradiated with sunlight. Since ultraviolet rays are included in the sunlight, an ultraviolet absorber is conventionally known to be blended in an interlayer film for a laminated glass in order to prevent the inside of the wheeled vehicle and the inside of the architectural structure from being irradiated with the ultraviolet rays.

As the ultraviolet absorber, there have been known many ultraviolet absorbers having a maximum absorption wavelength peak of about 300 to 360 nm. For example, use of an oxanilide compound as an ultraviolet absorber in a polyvinyl acetal resin is disclosed in Patent Literature 1. This compound is shown to absorb UV-B, that is, ultraviolet rays of about 280 to 325 nm at a high absorption ratio.

Among the ultraviolet rays, ultraviolet rays having a wavelength of around 400 nm have been known to impart a burden on the eyes or skin of a person. The laminated glass is increasingly required to absorb also the ultraviolet rays of around 400 nm at a high absorption ratio. Therefore, for example, as shown in Patent Literature 2, an indole-based ultraviolet absorber having a specific structure and a benzotriazole compound having a specific structure have been known to be blended in an interlayer film for a laminated glass. In Patent Literature 2, use of the two ultraviolet absorbers is shown to provide a high absorption ratio at 400 nm.

CITATION LIST

Patent Literatures

PTL 1: JP 2012-46748 A
PTL 2: WO 2012/023616

SUMMARY OF INVENTION

Technical Problem

Since the window glass is generally used over a long period of time, the interlayer film for a laminated glass is also exposed to sunlight over a long period of time. Therefore, even if the interlayer film for a laminated glass is exposed to sunlight over a longer period of time, the interlayer film for a laminated glass may be required to satisfactorily maintain ultraviolet absorption performance, particularly ultraviolet absorption performance at around 400 nm.

Then, it is an object of the present invention to provide an interlayer film for a laminated glass satisfactorily maintaining ultraviolet absorption performance at around 400 nm over a long period of time.

Solution to Problem

As a result of intensive studies, the present inventors found that the problems can be solved by using a benzotriazole compound having a specific maximum absorption wavelength peak, and causing an interlayer film for a laminated glass to have predetermined transmittance characteristics, and completed the following present invention.

That is, the present invention provides the following [1] to [11].

[1] An interlayer film for a laminated glass comprising a benzotriazole-based compound having a maximum absorption wavelength peak of 370 nm or more and 405 nm or less, and having a transmittance difference represented by $T_{1000}-T_0$ is less than 2.0%, wherein $T_{1000}$ represents a transmittance at 400 nm after being irradiated with xenon light having an irradiance of 180 w/m$^2$ for 1000 hours at a black panel temperature of 83° C., a temperature in a chamber of 50° C., and a humidity in a chamber of 50% RH, and $T_0$ represents a transmittance at 400 nm before being irradiated.

[2] The interlayer film for a laminated glass according to the above [1], wherein the transmittance difference is −0.4% or more.

[3] The interlayer film for a laminated glass according to the above [1] or [2], further comprising a thermoplastic resin.

[4] The interlayer film for a laminated glass according to any one of the above [1] to [3], comprising at least one selected from the group consisting of a polyvinyl acetal resin and an ethylene-vinyl acetate copolymer resin.

[5] The interlayer film for a laminated glass according to any one of the above [1] to [4], further comprising a polyvinyl acetal resin and a plasticizer.

[6] The interlayer film for a laminated glass according to any one of the above [1] to [5], further comprising an ultraviolet absorber having a maximum absorption wavelength peak of 330 nm or more and less than 370 nm.

[7] The interlayer film for a laminated glass according to any one of the above [1] to [6], wherein the benzotriazole-based compound is a compound represented by the following formula (1),

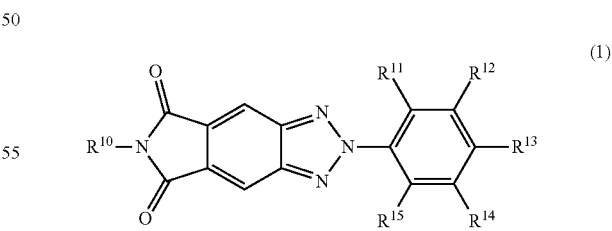

wherein
$R^{10}$ represents a hydrogen atom or a hydrocarbon group having 1 to 30 carbon atoms which optionally has a hetero atom;
$R^{11}$ to $R^{15}$ each independently represent a hydrogen atom, a hydroxyl group, a sulfo group, or a hydrocarbon group and having 1 to 30 carbon atoms which optionally has a hetero atom; and at least one of $R^{11}$ to $R^{15}$ represents a hydroxyl group.

[8] The interlayer film for a laminated glass according to any one of the above [1] to [7], wherein a content of the benzotriazole-based compound is 0.005 to 0.2% by mass.

[9] The interlayer film for a laminated glass according to any one of the above [1] to [8], wherein the transmittance $T_0$ at 400 nm before being irradiated is 7.0% or less.

[10] Laminated glass comprising: two glass plates; and the interlayer film for a laminated glass according to any one of the above [1] to [9] disposed between the two glass plates.

[11] The laminated glass according to the above [10], wherein the laminated glass does not include a light control body.

Advantageous Effects of Invention

The present invention can provide an interlayer film for a laminated glass satisfactorily maintaining ultraviolet absorption performance at around 400 nm over a long period of time.

DESCRIPTION OF EMBODIMENTS

[Interlayer Film for a Laminated Glass]

Hereinafter, an interlayer film for a laminated glass of the present invention will be described in detail.

The interlayer film for a laminated glass of the present invention contains a benzotriazole-based compound having a maximum absorption wavelength peak of 370 nm or more and 405 nm or less. In the present invention, the interlayer film for a laminated glass contains the benzotriazole-based compound, whereby a transmittance difference to be described later can be adjusted to a predetermined range while good ultraviolet absorption performance at around 400 nm of the interlayer film for a laminated glass is provided.

(Benzotriazole-Based Compound)

The maximum absorption wavelength peak of the benzotriazole-based compound is 370 nm or more and 405 nm or less, but the maximum absorption wavelength peak of less than 370 nm or more than 405 nm makes it difficult to provide good ultraviolet absorption performance at around 400 nm, or causes the interlayer film for a laminated glass to be colored. The maximum absorption wavelength peak is preferably 373 nm or more, and more preferably 375 nm or more. The maximum absorption wavelength peak is preferably 400 nm or less, and more preferably 395 nm or less.

In the present invention, the maximum absorption wavelengths of various benzotriazole-based compounds and ultraviolet absorbers can be measured by the following method. 0.0002 to 0.002 parts by mass of a compound to be measured is mixed with 100 parts by mass of chloroform, to obtain a chloroform solution. The obtained chloroform solution is put in a spectrophotometer quartz cell having a light path length of 1.0 cm. A transmittance of 300 to 2500 nm is measured using a self-recording spectrophotometer ("U4100" manufactured by Hitachi, Ltd.) to obtain a local maximum absorption wavelength. The local maximum absorption wavelength exhibits a transmittance having a local minimum value, and a plurality of local maximum absorption wavelengths may be present. In that case, the maximum absorption wavelength refers to a wavelength at which the local minimum value is least.

Specific examples of the benzotriazole-based compound include a compound represented by the following formula (1).

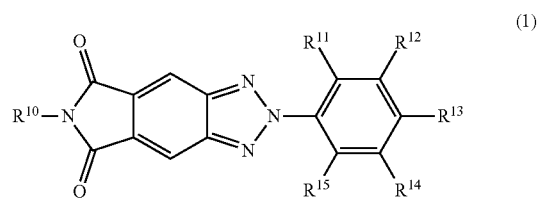

In the formula (1), $R^{10}$ represents a hydrogen atom or a hydrocarbon group having 1 to 30 carbon atoms which optionally has a hetero atom. $R^{11}$ to $R^{15}$ each independently represent a hydrogen atom, a hydroxyl group (—OH), a sulfo group (—SO$_3$H), or a hydrocarbon group having 1 to 30 carbon atoms which optionally has a hetero atom. At least one of $R^{11}$ to $R^{15}$ represents a hydroxyl group.

Herein, examples of the hydrocarbon group having 1 to 30 carbon atoms which optionally has a hetero atom in $R^{10}$ include an alkyl group, an aryl group, a heteroaryl group, an arylalkyl group, a heteroarylalkyl group, an alkenyl group, and an alkynyl group.

Examples of the hydrocarbon group having 1 to 30 carbon atoms which optionally has a hetero atom in $R^{11}$ to $R^{15}$ include an alkyl group, an arylalkyl group, a heteroarylalkyl group, a cycloalkyl group, a cyclo heteroalkyl group, an alkenyl group, and an aryl group.

Examples of the hetero atom include a nitrogen atom, an oxygen atom, a sulfur atom, and a halogen atom. Examples of the alkyl group include an alkyl group having 1 to 25 carbon atoms, and the alkyl group may have a straight chain structure or a branched structure. The cycloalkyl group may have 1 to 25 carbon atoms, and may be a cyclic alkyl group alone or a combination of a cyclic alkyl group and at least any one alkyl group of branched and straight-chain alkyl groups. The cyclo heteroalkyl group is obtained by substituting at least one of carbon atoms constituting a ring in the cycloalkyl group with a hetero atom. Some hydrogen atoms of the alkyl group or the cycloalkyl group may be substituted with a halogen group and the like. The alkenyl group and the alkynyl group may have a straight chain structure or a branched structure.

Examples of the aryl group include an aryl group which has a monocyclic aromatic ring or a polycyclic aromatic ring such as a bicyclic or tricyclic aromatic ring and has 6 to 30 carbon atoms. The heteroaryl group is a monocyclic group or a polycyclic group such as a bicyclic or tricyclic group. In the heteroaryl group, the total number of atoms constituting a ring is 5 to 30. Examples of the heteroaryl group include one in which at least one carbon atom in the basic skeleton of the ring of the aryl group is substituted with a hetero atom. In the aryl group and the heteroaryl group, a hydrogen atom on an aromatic ring may be substituted with an alkyl group or a halogen group or the like. In the case of the polycyclic group such as a bicyclic group, all rings may be aromatic, or some rings may be aromatic.

The arylalkyl group is a group having an aryl-alkyl structure bonded via an alkyl group, and is also referred to as an aralkyl group. Each of an alkyl group and an aryl group in the arylalkyl group is described above. The heteroarylalkyl group is a group having a heteroaryl-alkyl structure bonded via an alkyl group. Each of an alkyl group and a heteroaryl group in the heteroarylalkyl group is described above.

In the benzotriazole-based compound, among the above, at least $R^{11}$ is preferably a hydroxyl group. Specifically, the benzotriazole-based compound is preferably a compound represented by the following formula (2).

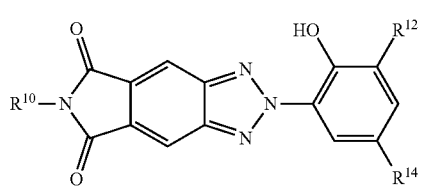

However, $R^{10}$, $R^{12}$, and $R^{14}$ are the same as the above.

In the formula (2), it is preferable that $R^{10}$ is an alkyl group, and $R^{12}$ and $R^{14}$ are each independently selected from an arylalkyl group (that is, an aralkyl group) or an alkyl group. Among these, it is more preferable that $R^{10}$ is an alkyl group having 2 to 20 carbon atoms, and $R^{12}$ and $R^{14}$ are each independently a phenyl alkyl group and an alkyl group. The alkyl group of $R^{12}$ and $R^{14}$ preferably has 5 to 15 carbon atoms. The phenyl alkyl group preferably has 7 to 12 carbon atoms.

Examples of the alkyl group of $R^{10}$, $R^{12}$, and $R^{14}$ include methyl, ethyl, isopropyl, n-propyl, isobutyl, n-butyl, pentyl, hexyl, 2-ethylhexyl, n-octyl, and 1,1,3,3-tetrametylbutyl groups. Examples of the phenyl alkyl group include benzyl, phenylethyl, phenylpropyl, and phenylbutyl groups. Examples of the phenylpropyl group include one having a propyl moiety having a branched structure, such as a 1-methyl-1-phenylethyl group, or a phenyl group may also be bonded to any position. The phenylethyl group and the phenylbutyl group and the like are also the same.

In the formula (2), preferably, $R^{12}$ is an aralkyl group and $R^{14}$ is an alkyl group.

Specific examples of the benzotriazole compound include 6-butyl-2-[2-hydroxy-3-(1-methyl-1-phenylethyl)-5-(1,1,3,3-tetramethylbutyl)-phenyl]-pyrrolo[3,4-f][benzotriazole-5,7(2H,6H)-dione]. Examples of the commercialized product include TINUVIN CarboProtect (trade name, manufactured by BASF A.G.).

The content of the benzotriazole-based compound in the interlayer film for a laminated glass is preferably 0.005 to 0.2% by mass based on the total amount of the interlayer film for a laminated glass. The content is set to be equal to or greater than the lower limit, whereby good ultraviolet absorption performance at around 400 nm is provided and a transmittance difference to be described later is likely to be adjusted to a predetermined range. From the viewpoint of being likely to adjust the transmittance difference to a predetermined range while providing excellent ultraviolet absorption performance at around 400 nm, the content is more preferably 0.01% by mass or more, still more preferably 0.02% by mass or more, and yet still more preferably 0.04% by mass or more.

The content of the triazole-based compound is set to be equal to or less than the upper limit, whereby the triazole-based compound exhibits performance commensurate with the content, and also prevents the interlayer film for a laminated glass from being colored. From these viewpoints, the content of the triazole-based compound is preferably 0.15% by mass or less, more preferably 0.1% by mass or less, still more preferably 0.06% by mass or less, and particularly preferably 0.042% by mass or less.

(Transmittance Characteristics)

The interlayer film for a laminated glass of the present invention has a transmittance difference represented by $T_{1000}-T_0$ of less than 2.0%, wherein $T_{1000}$ represents a transmittance at 400 nm after being irradiated with xenon light under the following condition for 1000 hours, and $T_0$ represents a transmittance at 400 nm before being irradiated.

Condition: irradiated with xenon light having an irradiance of 180 w/m² at a black panel temperature of 83° C., a temperature in a chamber of 50° C., and a humidity in a chamber of 50% RH In the measurements of the transmittances $T_0$ and $T_{1000}$, the transmittance of whole laminated glass measured in a state where the interlayer film for a laminated glass is sandwiched between two clear glass plates, and the clear glass plates are bonded to provide the laminated glass is taken as the transmittance of the interlayer film for a laminated glass. The laminated glass is irradiated with the xenon light. As the clear glass plate, clear glass (visible light transmittance: 90.4%) having a thickness of 2.5 mm based on JIS R 3202: 2011 is used. The clear glass has a high transmittance, whereby the transmittance and the transmittance difference of the interlayer film for a laminated glass can be substantially confirmed by confirming the transmittance and the transmittance difference of the laminated glass. The test method will be described in detail in Examples to be described later.

If the interlayer film for a laminated glass has the transmittance difference of 2.0% or more, the interlayer film for a laminated glass is used in window glass and the like for a long period of time, so that the interlayer film for a laminated glass is deteriorated by the irradiation of sunlight and the like. This causes an increased transmittance at 400 nm after being used for a long period of time, which makes it difficult to satisfactorily maintain ultraviolet absorption performance at around 400 nm over a long period of time.

From the viewpoint of providing excellent ultraviolet absorption performance at around 400 nm over a long period of time, the transmittance difference is preferably 1.85% or less, more preferably 0.55% or less, and still more preferably 0.1% or less.

The transmittance difference may be 0% or close to 0%. The transmittance difference is preferably −0.4% or more, more preferably −0.3% or more, still more preferably −0.1% or more, and particularly preferably −0.04% or more.

From the viewpoint of improving the ultraviolet absorption performance at around 400 nm, the transmittance $T_0$ at 400 nm is preferably lower. The transmittance $T_0$ at 400 nm is, for example, 7.0% or less, preferably 3% or less, more preferably 1.5% or less, still more preferably 1% or less, and particularly preferably 0.75% or less.

The transmittance $T_0$ at 400 nm is, for example, 0.01% or more, preferably 0.1% or more, more preferably 0.2% or more, and still more preferably 0.4% or more. By setting the transmittance $T_0$ to be equal to or greater than these lower limits, transparency in a visible light range is likely to be secured, whereby the interlayer film for a laminated glass is prevented from being colored.

The visible light transmittance of the interlayer film for a laminated glass is preferably 70% or more. By setting the visible light transmittance to 70% or more, view is prevented from being blocked even if the interlayer film for a laminated glass is used for various window glasses such as a windshield of an automobile. The visible light transmittance is preferably 75% or more. The upper limit of the visible light transmittance is not particularly limited, and is, for example, 95% or less.

The visible light transmittance of laminated glass measured in a state where an interlayer film for a laminated glass is sandwiched between two clear glass plates, and the clear glass plates are bonded to provide the laminated glass as with the measurements of the transmittances $T_0$ and $T_{1000}$ is taken as the visible light transmittance of the interlayer film for a laminated glass. The visible light transmittance is measured based on JIS R 3106 (1998).

(Second Ultraviolet Absorber)

The interlayer film for a laminated glass of the present invention preferably contains a second ultraviolet absorber in addition to the benzotriazole-based compound (hereinafter, also referred to as a "first ultraviolet absorber") having a maximum absorption wavelength peak of 370 nm or more and 405 nm or less. The second ultraviolet absorber is an ultraviolet absorber having a maximum absorption wavelength peak of 330 nm or more and less than 370 nm.

The interlayer film for a laminated glass contains the second ultraviolet absorber in addition to the first ultraviolet absorber, whereby the interlayer film for a laminated glass has good ultraviolet absorption performance over a wide wavelength region. The above-mentioned absorption difference is likely to be adjusted into a desired range.

The maximum absorption wavelength peak of the second ultraviolet absorber is preferably 340 nm or more and 360 nm or less.

Specific preferable examples of the second ultraviolet absorber include a triazine-based compound, a benzotriazole-based compound, a benzophenone-based compound, and zinc particles. A benzotriazole-based compound is more preferable.

The benzotriazole-based compound used for the second ultraviolet absorber is a compound which has a different structure from that of the benzotriazole-based compound used for the first ultraviolet absorber and is represented by, for example, the following formula (3).

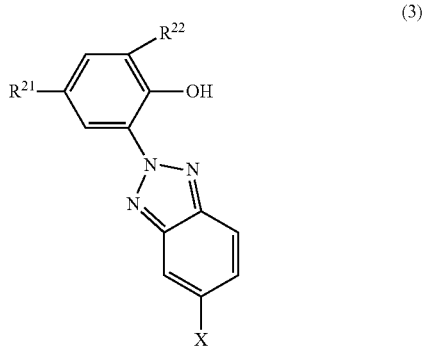

(3)

In the formula (3), $R^{21}$ represents a hydrogen atom, an alkyl group having 1 to 8 carbon atoms, or an alkoxycarbonylalkyl group having 4 to 20 carbon atoms; $R^{22}$ represents a hydrogen atom or an alkyl group having 1 to 8 carbon atoms; and X is a chlorine atom or a hydrogen atom.

In the formula (3), the alkyl groups of $R^{21}$ and $R^{22}$ may have a straight chain structure or a branched structure. The alkoxycarbonylalkyl group may have a straight chain structure or a branched structure. Examples of $R^{21}$ and $R^{22}$ include a hydrogen atom, methyl, ethyl, n-propyl, isopropyl, n-butyl, tert-butyl, pentyl, hexyl, and octyl groups. Examples of $R^{21}$ include, in addition to these groups, methoxycarbonylpropyl and octyloxycarbonylpropyl groups. Among these, $R^{21}$ is preferably a hydrogen atom or an alkyl group, and particularly preferably a hydrogen atom, and methyl, tert-butyl, pentyl, and octyl groups. $R^{21}$ may be the same as or different from $R^{22}$.

Specific examples of the compound represented by the formula (3) include 2-(3-t-butyl-5-methyl-2-hydroxyphenyl)-5-chlorobenzotriazole, 2-(3,5-di-t-butyl-2-hydroxyphenyl)-5-chlorobenzotriazole, octyl 3-[3-tert-butyl-5-(5-chloro-2H-benzotriazole-2-yl)-4-hydroxyphenyl] propionate, methyl 3-(5-chloro-2H-benzotriazole-2-yl)-5-(1,1-dimethylethyl)-4-hydroxyphenyl propionate, and 2-(3,5-di-tert-amyl-2-hydroxyphenyl)benzotriazole.

Furthermore, the benzotriazole-based compound used for the second ultraviolet absorber may be a commercialized product. Examples thereof include TINUVIN 326 and TINUVIN 327 (trade name, manufactured by Ciba Specialty Chemicals Inc.).

Examples of the triazine-based compound include known compounds having a triazine skeleton and used as the ultraviolet absorber. Specific examples of the triazine-based compound include hydroxyphenyl triazine-based compounds typified by TINUVIN460 and TINUVIN477 (trade name, manufactured by Ciba Specialty Chemicals Inc.).

The content of the second ultraviolet absorber in the interlayer film for a laminated glass is preferably 0.1 to 2% by mass based on the total amount of the interlayer film for a laminated glass. By setting the content to be equal to or greater than the lower limit, good ultraviolet absorption performance is likely to be provided over a wide wavelength region. Furthermore, the deterioration of the first ultraviolet absorber is likely to be prevented, and the absorption difference is likely to be reduced. From these viewpoints, the content of the second ultraviolet absorber is more preferably 0.2% by mass or more, and still more preferably 0.5% by mass or more.

The content of the second ultraviolet absorber is set to be equal to or less than the upper limit, whereby the second ultraviolet absorber exhibits performance commensurate with the blending amount, and prevents the interlayer film for a laminated glass from being colored. From these viewpoints, the content is preferably 1.5% by mass or less, and more preferably 1.0% by mass or less.

(Third Ultraviolet Absorber)

The interlayer film for a laminated glass of the present invention may contain a third ultraviolet absorber in addition to the first and second ultraviolet absorbers. The third ultraviolet absorber has a maximum absorption wavelength peak of 370 nm or more and 405 nm or less, but the third ultraviolet absorber is a compound other than the benzotriazole-based compound.

Specific examples of the third ultraviolet absorber include an indole-based compound and a coumarin-based compound. The maximum absorption wavelength peak of the third ultraviolet absorber is more preferably 373 nm or more, and still more preferably 375 nm or more. The maximum absorption wavelength peak is more preferably 400 nm or less, and still more preferably 395 nm or less.

In the present invention, the use of the third ultraviolet absorber is likely to provide improved ultraviolet absorption performance at around 400 nm. If the third ultraviolet absorber is exposed to sunlight for a long period of time, the third ultraviolet absorber is deteriorated, which is apt to cause deteriorated ultraviolet absorption performance. However, the use of the third ultraviolet absorber in combination with the above-mentioned first ultraviolet absorber suppresses the deterioration of the third ultraviolet absorber to prevent the above-mentioned transmittance difference from increasing.

The indole-based compound has an indole skeleton, and preferable examples thereof include a compound represented by the following formula (4).

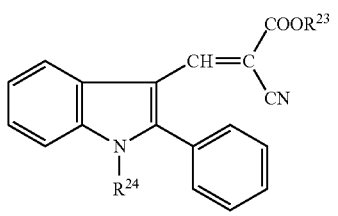

(4)

In the formula (4), $R^{23}$ represents an alkyl group having 1 to 3 carbon atoms; and $R^{24}$ represents a hydrogen atom, an alkyl group having 1 to 10 carbon atoms, or an aralkyl group having 7 to 10 carbon atoms.

The alkyl groups of $R^{23}$ and $R^{24}$ may have a straight chain structure or a branched structure. Examples of $R^{23}$ in the formula (4) include methyl, ethyl, isopropyl, and n-propyl groups. Among these, $R^{23}$ is preferably methyl, ethyl, and isopropyl groups. From the viewpoint of light resistance, $R^{23}$ is more preferably a methyl or ethyl group.

$R^{24}$ in the formula (4) is preferably an alkyl group having 1 to 10 carbon atoms, and more preferably an alkyl group having 1 to 8 carbon atoms. Examples of the alkyl group having 1 to 10 carbon atoms include methyl, ethyl, isopropyl, n-propyl, isobutyl, n-butyl, pentyl, hexyl, 2-ethyl hexyl, and n-octyl groups. Examples of the aralkyl group having 7 to 10 carbon atoms include benzyl, phenyl ethyl, phenyl propyl, and phenyl butyl groups.

The coumarin-based compound which can be used is known as the ultraviolet absorber. Examples thereof include Eusorb UV-1990 (trade name, manufactured by Eutec Chemical Co., Ltd.).

The content of the third ultraviolet absorber is preferably 0.001 to 0.2% by mass based on the total amount of the interlayer film for a laminated glass. By setting the content to be equal to or greater than the lower limit, good ultraviolet absorption performance at around 400 nm can be provided by the third ultraviolet absorber. From the viewpoint of providing good ultraviolet absorption performance at around 400 nm, the content of the third ultraviolet absorber is more preferably 0.005% by mass or more, and still more preferably 0.007% by mass or more.

By setting the content to be equal to or less than the upper limit, performance commensurate with content is likely to be exhibited. Defects such as the coloring of the interlayer film for a laminated glass and the increase in the transmittance difference are less likely to occur. From these viewpoints, the content of the third ultraviolet absorber is preferably 0.1% by mass or less, more preferably 0.05% by mass or less, and still more preferably 0.03% by mass or less.

(Thermoplastic Resin)

The interlayer film for a laminated glass preferably contains a thermoplastic resin. The interlayer film for a laminated glass contains the thermoplastic resin, which is likely to serve a function as the adhesion layer, whereby good adhesiveness to a glass plate and the like is provided.

Examples of the thermoplastic resin include, but are not particularly limited to, a polyvinyl acetal resin, an ethylene-vinyl acetate copolymer resin, an ionomer resin, a polyurethane resin, and a thermoplastic elastomer. The use of these resins is likely to secure adhesiveness to the glass plate. In the interlayer film for a laminated glass, each of the thermoplastic resins may be used alone, or two or more of them may be used in combination. Among these, at least one selected from a polyvinyl acetal resin and an ethylene-vinyl acetate copolymer resin is preferable, and a polyvinyl acetal resin is more preferable from the viewpoint of exhibiting excellent adhesiveness to glass when the polyvinyl acetal resin is used in combination with a plasticizer.

(Polyvinyl Acetal Resin)

The polyvinyl acetal resin is not particularly limited as long as it is obtained by acetalizing a polyvinyl alcohol with an aldehyde, and a polyvinyl butyral resin is suitable.

A preferable lower limit of the acetalization degree of the polyvinyl acetal resin is 40 mol %, and a preferable upper limit thereof is 85 mol %. A more preferable lower limit thereof is 60 mol %, and a more preferable upper limit thereof is 75 mol %.

A preferable lower limit of the amount of hydroxyl groups of the polyvinyl acetal resin is 15 mol %, and a preferable upper limit thereof is 35 mol %. The amount of the hydroxyl groups of 15 mol % or more is likely to provide good adhesiveness to a glass plate and the like, and good penetration resistance of the laminated glass, and the like. The amount of the hydroxyl groups is set to 35 mol % or less, which prevents the laminated glass from being too hard. A more preferable lower limit of the amount of the hydroxyl groups is 25 mol %, and a more preferable upper limit thereof is 33 mol %.

When a polyvinyl butyral resin is used as the polyvinyl acetal resin, from the same viewpoint, a preferable lower limit of the amount of the hydroxyl groups is 15 mol %, and a preferable upper limit thereof is 35 mol %. A more preferable lower limit of the hydroxyl groups is 25 mol %, and a more preferable upper limit thereof is 33 mol %.

The acetalization degree and the amount of the hydroxyl groups can be measured by a method based on JIS K 6728 "Testing methods for polyvinyl butyral", for example.

The polyvinyl acetal resin can be prepared by acetalizing a polyvinyl alcohol with an aldehyde. The polyvinyl alcohol is usually obtained by saponifying a poly vinyl acetate, and a polyvinyl alcohol with a saponification degree of 80 to 99.8 mol % is generally used.

A preferable lower limit of the polymerization degree of the polyvinyl acetal resin is 500, and a preferable upper limit thereof is 4,000. The polymerization degree is set to 500 or more, whereby the laminated glass has good penetration resistance. The polymerization degree is set to 4,000 or less, whereby the laminated glass is likely to be molded. A preferable lower limit of the polymerization degree is 1000, and a preferable upper limit thereof is 3600.

The aldehyde is not particularly limited, and generally, a C1 to C10 aldehyde is suitably used. The C1 to C10 aldehyde is not particularly limited, and examples thereof include n-butyl aldehyde, isobutyl aldehyde, n-valer aldehyde, 2-ethyl butyl aldehyde, n-hexyl aldehyde, n-octyl aldehyde, n-nonyl aldehyde, n-decyl aldehyde, formaldehyde, acetaldehyde, and benzaldehyde. Among these, n-butyl aldehyde, n-hexyl aldehyde, and n-valer aldehyde are preferable, and n-butyl aldehyde is more preferable. Each of these aldehydes may be used alone, or two or more of them may be used in combination.

(Ethylene-Vinyl Acetate Copolymer Resin)

The ethylene-vinyl acetate copolymer resin may be a non-crosslinked type ethylene-vinyl acetate copolymer resin or a high temperature crosslinked type ethylene-vinyl acetate copolymer resin. There may also be used modified ethylene-vinyl acetate resins such as saponified ethylene-vinyl acetate copolymer and hydrolyzed ethylene vinyl acetate as the ethylene-vinyl acetate copolymer resin.

The ethylene-vinyl acetate copolymer resin preferably has a vinyl acetate content of 10 to 50% by mass, and more preferably 20 to 40% by mass, as measured based on JIS K 6730 "Testing method for ethylene-vinyl acetate resin". The vinyl acetate content is set to be equal to or greater than these lower limits, whereby the adhesiveness to the glass is increased, and the penetration resistance of the laminated glass is likely to be good. The vinyl acetate content is set to be equal to or less than these upper limits, whereby the breaking strength of the interlayer film for a laminated glass is increased, which provides good shock resistance of the laminated glass.

(Ionomer Resin)

The ionomer resin is not particularly limited, and various ionomer resins may be used. Specific examples thereof include an ethylene-based ionomer, a styrene-based ionomer, a perfluorocarbon-based ionomer, a telechelic ionomer, and a polyurethane ionomer. Among these ionomers, an ethylene-based ionomer is preferable from the viewpoints of good mechanical strength, durability, and transparency and the like of the laminated glass, and excellent adhesiveness to glass.

Since an ionomer of an ethylene-unsaturated carboxylic acid copolymer has excellent transparency and high toughness, the ionomer is suitably used as the ethylene-based ionomer. The ethylene-unsaturated carboxylic acid copolymer is a copolymer containing at least a constitutional unit derived from ethylene and a constitutional unit derived from unsaturated carboxylic acid, and may have a constitutional unit derived from other monomer.

Examples of the unsaturated carboxylic acid include acrylic acid, methacrylic acid, and maleic acid. Acrylic acid and methacrylic acid are preferable, and methacrylic acid is particularly preferable. Examples of the other monomer include an acrylic acid ester, a methacrylic acid ester, and 1-butene.

The ethylene-unsaturated carboxylic acid copolymer preferably contains 75 to 99 mol % of the constitutional unit derived from ethylene and preferably contains 1 to 25 mol % of the constitutional unit derived from unsaturated carboxylic acid, when all the constitutional units contained in the copolymer is 100 mol %.

The ionomer of the ethylene-unsaturated carboxylic acid copolymer is an ionomer resin obtained by neutralizing or crosslinking at least a part of carboxyl groups contained in the ethylene-unsaturated carboxylic acid copolymer with metal ions. The degree of neutralization of the carboxyl group is usually 1 to 90%, and preferably 5 to 85%.

Examples of an ion source in the ionomer resin include alkaline metals such as lithium, sodium, potassium, rubidium, and cesium, and polyvalent metals such as magnesium, calcium, and zinc. Sodium and zinc are preferable.

A method for manufacturing the ionomer resin is not particularly limited, and the ionomer resin can be manufactured by a conventionally known manufacturing method. For example, when the ionomer of ethylene-unsaturated carboxylic acid copolymer is used as the ionomer resin, for example, ethylene and unsaturated carboxylic acid are subjected to radical copolymerization at elevated temperatures and pressures to manufacture an ethylene-unsaturated carboxylic acid copolymer. The ionomer of ethylene-unsaturated carboxylic acid copolymer can be manufactured by causing the ethylene-unsaturated carboxylic acid copolymer to react with a metallic compound containing the ion source.

(Polyurethane Resin)

Examples of the polyurethane resin include polyurethane obtained by causing an isocyanate compound to react with a diol compound, and polyurethane obtained by causing an isocyanate compound to react with a diol compound, and a chain extender such as polyamine. The polyurethane resin may contain a sulfur atom. In that case, a part or the whole of the diol may be selected from a polythiol and a sulfur-containing polyol. The polyurethane resin can provide good adhesiveness to organic glass. Therefore, when the glass plate is organic glass, the polyurethane resin is suitably used.

(Thermoplastic Elastomer)

Examples of the thermoplastic elastomer include a styrene-based thermoplastic elastomer and an aliphatic polyolefin. The styrene-based thermoplastic elastomer is not particularly limited, and a known styrene-based thermoplastic elastomer can be used. The styrene-based thermoplastic elastomer generally has a styrene monomer polymer block serving as a hard segment, and a conjugate diene compound polymer block or its hydrogenated block, serving as a soft segment. Specific examples of the styrene-based thermoplastic elastomer include a styrene-isoprene diblock copolymer, a styrene-butadiene diblock copolymer, a styrene-isoprene styrene triblock copolymer, a styrene-butadiene/isoprene-styrene triblock copolymer, a styrene-butadiene-styrene triblock copolymer, and their hydrogenated products.

The aliphatic polyolefin may be a saturated aliphatic polyolefin, or may be an unsaturated aliphatic polyolefin. The aliphatic polyolefin may be a polyolefin containing a chain olefin as a monomer, or may be a polyolefin containing a cyclic olefin as a monomer. From the viewpoint of effectively improving the preservation stability of the intermediate film, and sound insulating properties, the aliphatic polyolefin is preferably a saturated aliphatic polyolefin.

Examples of the material of the aliphatic polyolefin include ethylene, propylene, 1-butene, trans-2-butene, cis-2-butene, 1-pentene, trans-2-pentene, cis-2-pentene, 1-hexene, trans-2-hexene, cis-2-hexene, trans-3-hexene, cis-3-hexene, 1-heptene, trans-2-heptene, cis-2-heptene, trans-3-heptene, cis-3-heptene, 1-octene, trans-2-octene, cis-2-octene, trans-3-octene, cis-3-octene, trans-4-octene, cis-4-octene, 1-nonen, trans-2-nonen, cis-2-nonen, trans-3-nonen, cis-3-nonen, trans-4-nonen, cis-4-nonen, 1-decene, trans-2-decene, cis-2-decene, trans-3-decene, cis-3-decene, trans-4-decene, cis-4-decene, trans-5-decene, cis-5-decene, 4-methyl-1-pentene, and vinyl cyclohexane.

(Plasticizer)

The interlayer film for a laminated glass may further contain a plasticizer when it contains the thermoplastic resin. The interlayer film for a laminated glass contains the plasticizer, whereby the interlayer film for a laminated glass is softened. As a result, the laminated glass is softened. Furthermore, high adhesiveness to the glass plate can also be exhibited. When the polyvinyl acetal resin is used as the thermoplastic resin of the interlayer film for a laminated glass, the plasticizer contained in the layer is particularly effective.

Examples of the plasticizer include organic ester plasticizers such as a monobasic organic acid ester and a polybasic organic acid ester, and phosphate plasticizers such as an organic phosphate plasticizer and an organic phosphite plasticizer. Among these, an organic ester plasticizer is preferable.

Examples of the organic ester plasticizer include triethylene glycol di-2-ethyl butyrate; triethylene glycol di-2-ethylhexanoate; triethylene glycol dicaprylate; triethylene glycol di-n-octanoate; triethylene glycol di-n-heptanoate; tetraethylene glycol di-n-heptanoate; tetraethylene glycol di-2-ethylhexanoate; dibutyl sebacate; dioctyl azelate; dibutyl carbitol adipate; ethylene glycol di-2-ethyl butyrate; 1,3-propylene glycol di-2-ethylbutyrate; 1,4-butylene glycol di-2-ethylbutyrate; 1,2-butylene glycol di-2-ethylbutyrate;

diethylene glycol di-2-ethylbutyrate; diethylene glycol di-2-ethylhexanoate; dipropylene glycol di-2-ethylbutyrate; triethylene glycol di-2-ethylpentanoate; tetraethylene glycol di-2-ethylbutyrate; diethylene glycol dicapriate; triethylene glycol di-n-heptanoate; tetraethylene glycol di-n-heptanoate; triethylene glycol di-2-ethyl butyrate; adipic acid dihexyl; adipic acid dioctyl; hexylcyclohexyl adipate; diisononyl adipate; heptyl nonyl adipate; dibutyl sebacate; oil-modified sebacic acid alkyd; mixtures of a phosphoric acid ester and an adipic acid ester; and mixed adipic acid esters. Examples of the mixed adipic acid ester include an adipic acid ester prepared from two or more alcohols selected from a C4 to C9 alkyl alcohol, and a C4 to C9 cyclic alcohol.

Among these plasticizers, triethylene glycol-di-2-ethyl-hexanoate (3GO) is particularly suitably used.

In the interlayer film for a laminated glass, the content of the plasticizer is not particularly limited, and a preferable lower limit of the content thereof is 30 parts by mass, and a preferable upper limit thereof is 70 parts by mass, per 100 parts by mass of the thermoplastic resin. If the content of the plasticizer is 30 parts by mass or more, the laminated glass is moderately softened, which provides good handling characteristics and the like. If the content of the plasticizer is 70 parts by mass or less, the plasticizer is prevented from being separated from the interlayer film for a laminated glass. A preferable lower limit of the content of the plasticizer is 35 parts by mass, and a preferable upper limit thereof is 63 parts by mass.

When the interlayer film for a laminated glass contains the thermoplastic resin, the film contains the thermoplastic resin, or the thermoplastic resin and the plasticizer as a main component. The total amount of the thermoplastic resin and the plasticizer is usually 70% by mass or more, preferably 80% by mass or more, and still more preferably 90% by mass or more based on the total amount of the interlayer film for a laminated glass.

(Other Additives)

The interlayer film for a laminated glass may further contain an infrared absorbing agent. The interlayer film for a laminated glass containing the infrared absorbing agent can exhibit high heat insulation. The infrared absorbing agent is not particularly limited as long as it has the property of shielding infrared rays, and suitable examples thereof include tin-doped indium oxide particles.

The interlayer film for a laminated glass may further contain additives such as an antioxidant, a light stabilizer, an adhesion control agent, a colorant, a dye, a fluorescent whitening agent, and a nucleating agent as necessary.

The antioxidant is not particularly limited, and examples thereof include 2,2-bis[[[3-(3,5-di-tert-butyl-4-hydroxyphenyl)propionyl]oxy]methyl]propane-1,3-diol1,3-bis[3-(3,5-di-tert-butyl-4-hydroxyphenyl)propionate], 4,4'-thiobis(6-tert-butyl-3-methylphenol), 4,4'-dimethyl-6,6'-di(tert-butyl) [2,2'-methylenebis(phenol)], 2,6-di-t-butyl-p-cresol, and 4,4'-butylidenebis-(6-t-butyl-3-methylphenol).

The nucleating agent is not particularly limited, and examples thereof include dibenzylidene sorbitol, dibenzylidene xylitol, dibenzylidene dulcitol, dibenzylidene mannitol, and calixarene. When the ethylene-vinyl acetate copolymer resin is used as the thermoplastic resin, the nucleating agent is suitably used.

As the adhesion control agent, for example, various magnesium salts or potassium salts or the like are used.

The thickness of the interlayer film for a laminated glass is preferably 0.1 to 3 mm. By setting the thickness of the interlayer film for a laminated glass to 0.1 mm or more, sufficient ultraviolet absorption performance can be exhibited. The penetration resistance of the laminated glass is also good. By setting the thickness of the interlayer film for a laminated glass to 3 mm or less, the deterioration of the transparency of the interlayer film for a laminated glass is prevented. The lower limit of the thickness of the interlayer film for a laminated glass is more preferably 0.25 mm, and the upper limit of the thickness is more preferably 2 mm.

The interlayer film for a laminated glass may be molded by, for example, kneading materials constituting the intermediate film such as a thermoplastic resin and a benzotriazole compound, and subjecting the obtained composition to extrusion molding and press molding and the like. When the plasticizer is used at this time, the composition may be prepared by dissolving the ultraviolet absorber such as a benzotriazole compound in the plasticizer to obtain a mixture, and kneading the mixture and the thermoplastic resin such as a polyvinyl acetal resin.

[Laminated Glass]

The laminated glass of the present invention includes two glass plates and the interlayer film for a laminated glass disposed between the two glass plates.

In the laminated glass, the layer between the two glass plates may be composed of one resin layer, or may have a laminated structure in which two or more resin layers are laminated. When the layer is composed of one resin layer, the resin layer is the above-mentioned interlayer film for a laminated glass.

In the case of the laminated structure composed of two or more resin layers, at least one layer of the resin layers may be the above-mentioned interlayer film for a laminated glass, and the laminated structure may contain a resin layer other than the above-mentioned interlayer film for a laminated glass.

The resin layer other than the above-mentioned interlayer film for a laminated glass may have the same configuration as that of the above-mentioned interlayer film for a laminated glass except that the resin layer does not contain a benzotriazole-based compound having a maximum absorption wavelength peak of 370 nm or more and 405 nm or less. That is, such a resin layer preferably uses a thermoplastic resin as a resin, and specific examples of the thermoplastic resin include the above-mentioned various thermoplastic resins. The various thermoplastic resins are described in detail above. The resin layer may contain a plasticizer in addition to the thermoplastic resin, or may contain other additive. Furthermore, the resin layer may contain a second ultraviolet absorber and the like. The plasticizer and the other additive are described in detail above, and the description thereof will be omitted.

(Glass Plate)

The glass plate used in the laminated glass may be any of inorganic glass and organic glass, and inorganic glass is preferable. Examples of the inorganic glass include, but are not particularly limited to, clear glass, float plate glass, polished plate glass, molded plate glass, meshed plate glass, wired plate glass, and green glass.

As organic glass, one generally referred to as resin glass is used without particular limitation, and examples thereof include organic glass composed of a resin such as polycarbonate, an acrylic resin, an acrylic copolymer resin, or polyester.

The two glass plates may be composed of the same material or different materials. For example, one of the two glass plates may be inorganic glass, and the other may be organic glass. It is preferable that both of the two glass plates are inorganic glasses or organic glasses.

The thickness of each of the glass plates is not particularly limited, but the thickness is, for example, about 0.1 to 15 mm, and preferably 0.5 to 5 mm. The thickness of each of the glass plates may be the same or different from each other, and is preferably the same.

The laminated glass may be produced by disposing the above-mentioned interlayer film for a laminated glass, and a resin layer used as necessary between two glass plates, and subjecting these to pressure bonding and the like for integrating.

The laminated glass of the present invention does not typically include a light control body. The laminated glass may not include the light control body between the two glass plates. The light control body is a sheet shaped or layer-shaped member in which optical characteristics such as a transmittance at a predetermined wavelength are changed when various energies such as light energy, electric energy, and thermal energy are applied to the member. The light control body preferably has optical characteristics changed by applying electric energy. For example, the light control body includes any of a liquid crystal layer and an electrochromic layer.

(Liquid Crystal Layer)

The liquid crystal layer is a layer containing a liquid crystal, and examples thereof include one in which a liquid crystal is filled and sealed in a space formed by a spacer and the like. The liquid crystal may have any type, and may have a TN type or an STN type. The liquid crystal layer may be constituted by a polymer-dispersed liquid crystal (PDLC). Examples of the polymer-dispersed liquid crystal include a so-called network liquid crystal in which a polymer network structure is formed in a liquid crystal layer. The polymer-dispersed liquid crystal may be a microcapsule type liquid crystal (PDMLC) in which a liquid crystal is microencapsulated and dispersed in a binder resin. Examples of the binder resin used in PDMLC include a polyvinyl acetal resin such as a polyvinyl butyral resin.

The light control body includes a pair of transparent electrodes, for example, and a liquid crystal layer is disposed between the transparent electrodes to constitute a liquid crystal cell. An oriented film and the like may be provided between an electrode and a liquid crystal layer depending on the kind of the liquid crystal. In the PDLC and the PDMLC and the like, the oriented film is unnecessary. When a voltage is applied between the transparent electrodes, the liquid crystal in the liquid crystal layer is oriented in a single direction to cause light to transmit in the thickness direction of the light control body. Therefore, when the light control body includes the liquid crystal layer, the optical transmittances of the light control body and the laminated glass including the light control body are increased by applying a voltage, which provides a transparent light control body and laminated glass. Meanwhile, when a voltage is not applied, the optical transmittances of the light control body and the laminated glass including the light control body are decreased, which provides an opaque light control body and laminated glass, for example.

(Electrochromic Layer)

The electrochromic layer is a layer composed of an electrochromic material. The electrochromic material is not limited as long as it is a compound having electrochromic properties. The electrochromic material may be any of an inorganic compound, an organic compound, and a mixed valence complex.

Examples of the inorganic compound include $Mo_2O_3$, $Ir_2O_3$, $NiO$, $V_2O_5$, $WO_3$, and $TiO_2$. Examples of the organic compound include a polypyrrole compound, a polythiophene compound, a polyparaphenylene vinylene compound, a polyaniline compound, a polyacetylene compound, a polyethylene dioxythiophene compound, a metal phthalocyanine compound, a viologen compound, a viologen salt compound, a ferrocene compound, a dimethyl terephthalate compound, and a diethyl terephthalate compound. Among these, a polyacetylene compound is preferable. Examples of the mixed valence complex include a Prussian blue type complex ($KFe[Fe(CN)_6]$ and the like).

The electrochromic layer can be formed by known methods, may be formed by sputtering, or may be formed by applying a solution in which an electrochromic material is diluted.

In the case when the light control body includes the electrochromic layer, the light control body may include a pair of transparent electrodes and the electrochromic layer disposed between the transparent electrodes. By applying a voltage between the transparent electrodes in the electrochromic layer, for example, a transmittance in a specific wavelength region is changed, whereby the transparent light control body is changed to an opaque light control body, or a color tone when irradiated with visible light is changed. Therefore, for example, when a voltage is not applied, the light control body is colorless and transparent, by contrast, when a voltage is applied, the light control body can have color tones such as blue, yellow, green, and red.

Between the transparent electrode and the electrochromic layer, various layers used in combination with the electrochromic layer such as an electrolyte layer may be provided. The electrolyte layer may contain a substance having thermochromic properties in which a transmittance in a predetermined region is changed in response heat and the like as necessary. The light control body contains the substance having thermochromic properties, whereby the transmittance in a specific wavelength region can be changed by heating and cooling.

The light control body generally includes a pair of substrates composed of a resin film and the like, and the pair of transparent electrodes and the electrochromic layer or the liquid crystal layer are disposed between the pair of the substrates. One resin film may be omitted in the light control body, and one transparent electrode may be directly provided on the glass plate.

As described above, when energy is applied or is not applied to the light control body by voltage application and the like, the light control body has a high transmittance, and is transparent. A visible light transmittance when the transmittance is high is 70% or more, but the visible light transmittance may be 80% or more, or 90% or more. The visible light transmittance can be measured using a spectrophotometer based on JISR3106 (1998).

The laminated glass of the present invention can be used in various fields, and is preferably used for window glass for wheeled vehicles such as automobiles and trains, various vehicles such as vessels and airplanes, or various architectural structures such as buildings, condominium buildings, free-standing houses, halls, and gymnasiums. The window glass is preferably disposed at a position into which sunlight is made incident. Since the interlayer film for a laminated glass has the above-mentioned predetermined transmittance characteristics, the ultraviolet absorption performance at around 400 nm of the laminated glass of the present invention can be satisfactorily maintained over a long period of time even if the laminated glass is used as window glass into which sunlight is made incident for a long period of time.

EXAMPLES

The present invention will be described in further detail using Examples, but the present invention is in no way limited by these examples.

[Measurement of Transmittance Characteristics]
(Preparation of Laminated Glass)

An interlayer film for a laminated glass obtained in each of Examples and Comparative Examples was held under constant temperature and humidity conditions of 23° C. and 28% RH for 4 hours, and then sandwiched between two clear glasses (50 mm long×65 mm wide×2.5 mm thick, visible light transmittance: 90.4%, based on JIS R 3202: 2011) to obtain a laminated body. The obtained laminated body was subjected to preliminary pressure bonding using a heating roller at 230° C. The laminated body subjected to preliminary pressure bonding was subjected to pressure bonding using an autoclave under conditions of 135° C. and pressure of 1.2 MPa for 20 minutes, to prepare laminated glass.

(Measurement of Transmittance $T_0$)

The light transmittance (%) at 400 nm of the laminated glass obtained above was measured with a spectrophotometer ("U-4000" manufactured by Hitachi, Ltd.) based on JIS R 3106 (1998), and taken as a transmittance $T_0$ at 400 nm of an interlayer film for a laminated glass.

(Measurement of Transmittance $T_{1000}$)

In a Xenon irradiator ("SX75" manufactured by Suga Test Instruments Co., Ltd.), the laminated glass obtained above was irradiated with xenon light having an irradiance of 180 w/m² (irradiance measurement wavelength: 300 to 400 nm) for 1000 hours at a black panel temperature of 83° C., a temperature in a chamber of 50° C., and a humidity in a chamber of 50% RH. At that time, an inner filter made of quartz and an outer filter made of quartz: #275 (cutoff: 275 nm) were used. Then, with the same method as that in the measurement of the transmittance $T_0$, a transmittance $T_{1000}$ at 400 nm of the interlayer film for a laminated glass was measured. A transmittance difference ($T_{1000}-T_0$) was calculated from the obtained transmittances $T_0$ and $T_{1000}$.

(Determination of Interlayer Film for a Laminated Glass)

The interlayer film for a laminated glass was evaluated according to the following evaluation criteria from the transmittance difference ($T_{1000}-T_0$) obtained above.

A: transmittance difference: 0.55% or less and −0.4% or more

B: transmittance difference: more than 0.55% and less than 2.0%

C: transmittance difference: 0.55% or less, but less than −0.4%

D: transmittance difference: 2.0% or more (Visible Light Transmittance)

The visible light transmittance of the laminated glass obtained above was measured based on JIS R 3106 (1998), and the obtained value was taken as the visible light transmittance of the interlayer film for a laminated glass.

(YI Value)

With respect to the laminated glass obtained above, a YI value of initial laminated glass was measured as with the measurement of the transmittance $T_0$.

The YI value of the laminated glass was obtained by measuring X, Y, and Z of standard light C with a transmission method based on JIS K7103 using a spectrophotometer ("U-4100" manufactured by Hitachi High-Tech Science Corporation). The YI value is represented by an absolute value.

Examples 1 to 5 and Comparative Examples 1 to 8

Components were mixed such that the contents of the components in the interlayer film for a laminated glass were shown in Table 1, and the obtained mixture was subjected to extrusion molding using a biaxial anisotropic extruder to prepare an interlayer film for a laminated glass having a film thickness of 760 nm. In Examples 1, and 3 to 5 and Comparative Examples 1 to 8, when compounds were mixed, an organic acid magnesium aqueous solution as an adhesion control agent was further added such that a Mg concentration in the interlayer film for a laminated glass was set to 65 ppm. The contents of an alkaline metal such as K and an alkaline-earth metal such as Mg can be measured with an ICP emission analyzing device ("ICPE-9000" manufactured by Shimadzu Corporation).

TABLE 1

| | | | Example 1 | Example 2 | Example 3 | Example 4 | Example 5 | Comparative Example 1 | Comparative Example 2 |
|---|---|---|---|---|---|---|---|---|---|
| Formulation (% by mass) | Thermoplastic resin | PVB | 70.7 | — | 70.7 | 70.7 | 71.1 | 71.1 | 71.2 |
| | | EVA | — | 98.9 | — | — | — | — | — |
| | UVA1 | Carbo-Project | 0.042 | 0.042 | 0.014 | 0.014 | 0.042 | — | — |
| | UVA2 | T326 | 0.756 | 0.756 | 0.756 | 0.756 | 0.212 | 0.212 | 0.142 |
| | UVA3 | Eusord UV-1990 | — | — | — | 0.007 | — | — | — |
| | | Indole of formula (4) R23 | — | — | — | — | — | CH₃ | — |
| | | R24 | — | — | — | — | — | CH₃ | — |
| | | Content | — | — | — | — | — | 0.08 | — |
| | | Plasticizer | 28.3 | — | 28.3 | 28.3 | 28.5 | 28.4 | 28.5 |
| | | Antioxidant 1 (BHT) | 0.142 | — | — | 0.142 | 0.142 | 0.142 | 0.142 |
| | | Antioxidant 2 (IRGANOX1010) | — | 0.142 | 0.142 | — | — | — | — |
| | | Nucleating agent | — | 0.1 | — | — | — | — | — |
| | | Total | 100 | 100 | 100 | 100 | 100 | 100 | 100 |
| Transmittance characteristics | | Transmittance $T_0$ @ 400 nm (%) | 0.622 | 0.584 | 1.27 | 0.484 | 6.5 | 10.8 | 29.1 |
| | | Transmittance $T_{1000}$ @ 400 nm (%) | 0.616 | 0.581 | 1.232 | 1.023 | 8.3 | 20.51 | 31.2 |
| | | $T_{1000}-T_0$ @ 400 nm (%) | −0.006 | −0.003 | −0.038 | 0.54 | 1.80 | 9.71 | 2.10 |
| | | Visible light transmittance (%) | 88 | 88 | 88 | 88 | 89 | 88 | 89 |
| | | YI | 6 | 6 | 4 | 4 | 5 | 17 | 1 |
| | | Determination | A | A | A | A | B | D | D |

TABLE 2

| | | | Comparative Example 3 | Comparative Example 4 | Comparative Example 5 | Comparative Example 6 | Comparative Example 7 | Comparative Example 8 |
|---|---|---|---|---|---|---|---|---|
| Formulation (% by mass) | Thermoplastic resin | PVB | 71.9 | 71.9 | 71.9 | 70.9 | 71.0 | 70.9 |
| | | EVA | — | — | — | — | — | — |
| | UVA1 | Carbo-Project | — | — | — | — | — | — |
| | UVA2 | T326 | — | — | — | 0.284 | 0.284 | 0.284 |
| | UVA3 | Eusorb UV-1990 | — | — | — | — | — | — |
| | Indole of formula (4) | $R^{23}$ | $C_2H_5$ | $C_2H_5$ | $CH_3$ | $CH_3$ | $C_2H_5$ | $CH_3$ |
| | | $R^{24}$ | $C_2H_5$ | $C_2H_5$ | $CH_3$ | $CH_3$ | $CH_3$ | $C_4H_9$ |
| | | Content | 0.001 | 0.050 | 0.034 | 0.142 | 0.034 | 0.142 |
| | Plasticizer | | 28.0 | 28.0 | 28.0 | 28.4 | 28.4 | 28.4 |
| | Antioxidant 1 (BHT) | | 0.10 | 0.10 | 0.10 | 0.28 | 0.28 | 0.28 |
| | Antioxidant 2 (IRGANOX1010) | | — | — | — | — | — | — |
| | Nucleating agent | | — | — | — | — | — | — |
| | Total | | 100 | 100 | 100 | 100 | 100 | 100 |
| Transmittance characteristics | Transmittance $T_0$ @ 400 nm (%) | | 69.7 | 0.2 | 0.7 | 0.1 | 0.2 | 0.1 |
| | Transmittance $T_{1000}$ @ 400 nm (%) | | 75 | 40.23 | 42.01 | 10.5 | 19 | 9.8 |
| | $T_{1000} - T_0$ @ 400 nm (%) | | 5.30 | 40.03 | 41.31 | 10.40 | 18.80 | 9.70 |
| | Visible light transmittance (%) | | 88 | 88 | 88 | 88 | 88 | 88 |
| | YI | | 1 | 13 | 11 | 22 | 10 | 21 |
| | Determination | | D | D | D | D | D | D |

*Components shown in Tables 1 and 2 are as follows.
(1) Thermoplastic Resin

Polyvinyl butyral resin (PVB): acetalization degree of 69 mol %, amount of hydroxyl groups of 30 mol %, acetalization degree of 1 mol %, polymerization degree of 1700

Ethylene-vinyl-acetate-copolymer resin (EVA): Acetic acid vinyl content of 28% by mass
(2) First Ultraviolet Absorber (UVA1)

Benzotriazole-based compound: TINUVIN CarboProtect (trade name, manufactured by BASF A.G.), compound name: "6-butyl-2-[2-hydroxy-3-(1-methyl-1-phenylethyl)-5-(1,1,3,3-tetramethylbutyl)-phenyl]-pyrrolo[3,4-f][benzotriazole-5,7(2H,6H)-dione]", maximum absorption wavelength peak; 375 nm (abbreviated as CarboProtect in Table)
(3) Second Ultraviolet Absorber (UVA2)

Benzotriazole-based compound, trade name: Tinuvin326, manufactured by Ciba Specialty Chemicals Inc., maximum absorption wavelength peak: 353 nm (abbreviated as T326 in Table)
(4) Third Ultraviolet Absorber (UVA3)

Coumarin-based compound: Eusorb UV-1990 (trade name. Eutec Chemical Corporation), maximum absorption wavelength peak: 384 nm Indole-based compound: indole-based compound produced with the following producing method To methanol (120 ml), 23.5 g (0.10 mol) of 1-methyl-2-phenyl-1H-indole-3-carbaldehyde and 11.9 g (0.12 mol) of methyl cyanoacetate were added. Then, 2.5 g (0.03 mol) of piperidine was added thereto. The mixture was reacted for 6 hours with reflux and then cooled to room temperature. Thereby, a precipitated crystal was obtained. The obtained crystal was washed with a small amount of alcohol, and then dried to obtain 30.9 g of a pale yellow crystal of an indole-based compound A, in which $R^{23}$ was a methyl group ($CH_3$) and $R^{24}$ was a methyl group ($CH_3$) in the formula (4). The obtained indole compound had a melting point of 193.7° C. and a highest maximum absorption wavelength peak of 391 nm.

Ethanol was used in place of methanol; ethyl cyanoacetate (0.12 mol) was used in place of methyl cyanoacetate; and 1-ethyl-2-phenyl-1H-indole-3-carbaldehyde (0.10 mol) was used in place of 1-methyl-2-phenyl-1H-indole-3-carbaldehyde. Except for these, with the same method as the preparing method of the indole compound A, 30.8 g of a pale yellow crystal of an indole compound B was obtained, in which $R^{23}$ was an ethyl group ($C_2H_5$) and $R^{24}$ was an ethyl group ($C_2H_5$) in the general formula (4).

Ethanol was used in place of methanol, and ethyl cyanoacetate (0.12 mol) was used in place of methyl cyanoacetate. Except for these, with the same method as the preparing method of the indole compound A, 28.9 g of a pale yellow crystal of an indole compound C was obtained, in which $R^{23}$ was an ethyl group ($C_2H_5$) and $R^{24}$ was a methyl group ($CH_3$) in the general formula (4). The melting point of the obtained indole compound C was 145° C.

1-butyl-2-phenyl-1H-indole-3-carbaldehyde (0.10 mol) was used in place of 1-methyl-2-phenyl-1H-indole-3-carbaldehyde. Except for these, with the same method as the preparing method of the indole compound A, 33.7 g of a pale yellow crystal of an indole compound D was obtained, in which $R^{23}$ was a methyl group ($C_2H_5$) and $R^{24}$ was a butyl group ($C_4H_9$) in the general formula (4).
(5) Plasticizer Triethylene glycol di-2-ethylhexanoate (3GO)
(6) Other Additives Antioxidant 1: 2,6-di-t-butyl-p-cresol (BHT)

Antioxidant 2: IRGANOX1010 (trade name), manufactured by BASF A.G.

Nucleating agent: clibenzylidene sorbitol

In Examples 1 to 5, the benzotriazole-based compound having a maximum absorption wavelength peak of 370 nm or more and 405 nm or less was blended, and the transmittance difference was set to be within a predetermined range, whereby good ultraviolet absorption performance at around 400 nm could be provided over a long period of time. Meanwhile, each of Comparative Examples used one or two ultraviolet absorbers, but any of the ultraviolet absorbers was not the benzotriazole-based compound having a maximum absorption wavelength peak of 370 nm or more and 405 nm or less, so that good ultraviolet absorption performance at around 400 nm could not be provided over a long period of time.

The invention claimed is:

1. An interlayer film for a laminated glass comprising a benzotriazole-based compound having a maximum absorption wavelength peak of 370 nm or more and 405 nm or less, and having a transmittance difference represented by $T_{1000}-T_0$ of less than 2.0%, wherein $T_{1000}$ represents a transmittance at 400 nm after being irradiated with xenon light having an irradiance of 180 w/m² for 1000 hours at a black panel temperature of 83° C., a temperature in a chamber of 50° C., and a humidity in a chamber of 50% RH, and $T_0$ represents a transmittance at 400 nm before being irradiated, wherein the interlayer film further comprises a compound which is represented by a following formula (3):

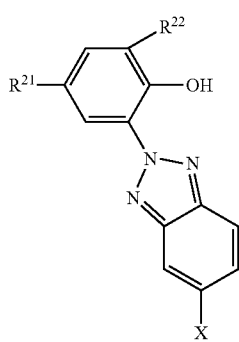

(3)

in the formula (3), $R^{21}$ represents a hydrogen atom, an alkyl group having 1 to 8 carbon atoms, or an alkoxycarbonylalkyl group having 4 to 20 carbon atoms; $R^{22}$ represents a hydrogen atom or an alkyl group having 1 to 8 carbon atoms; and X is a chlorine atom or a hydrogen atom.

2. The interlayer film for a laminated glass according to claim 1, wherein the transmittance difference is −0.4% or more.

3. The interlayer film for a laminated glass according to claim 1, further comprising a thermoplastic resin.

4. The interlayer film for a laminated glass according to claim 1, comprising at least one selected from the group consisting of a polyvinyl acetal resin and an ethylene-vinyl acetate copolymer resin.

5. The interlayer film for a laminated glass according to claim 1, further comprising a polyvinyl acetal resin and a plasticizer.

6. The interlayer film for a laminated glass according to claim 1, further comprising an ultraviolet absorber having a maximum absorption wavelength peak of 330 nm or more and less than 370 nm.

7. The interlayer film for a laminated glass according to claim 1, wherein the benzotriazole-based compound is a compound represented by the following formula (1),

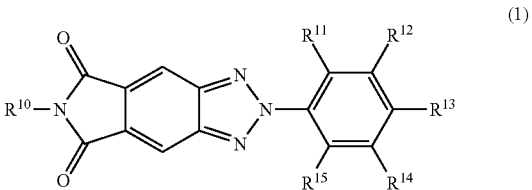

(1)

wherein
$R^{10}$ represents a hydrogen atom or a hydrocarbon group having 1 to 30 carbon atoms which optionally has a hetero atom;
$R^{11}$ to $R^{15}$ each independently represent a hydrogen atom, a hydroxyl group, a sulfo group, or a hydrocarbon group having 1 to 30 carbon atoms which optionally has a hetero atom; and
at least one of $R^{11}$ to $R^{15}$ represents a hydroxyl group.

8. The interlayer film for a laminated glass according to claim 1, wherein a content of the benzotriazole-based compound is 0.005 to 0.2% by mass.

9. The interlayer film for a laminated glass according to claim 1, wherein the transmittance $T_0$ at 400 nm before being irradiated is 7.0% or less.

10. Laminated glass comprising:
two glass plates; and
the interlayer film for a laminated glass according to claim 1 disposed between the two glass plates.

11. The laminated glass according to claim 10, wherein the laminated glass does not include a light control body.

* * * * *